United States Patent [19]

Zabinski

[11] Patent Number: 4,933,535

[45] Date of Patent: Jun. 12, 1990

[54] PIECEWISE LINEAR TEMPERATURE CONTROLLER UTILIZING PULSE WIDTH MODULATION

[75] Inventor: John E. Zabinski, Naperville, Ill.

[73] Assignee: Harper-Wyman Company, Lisle, Ill.

[21] Appl. No.: 311,705

[22] Filed: Feb. 15, 1989

[51] Int. Cl.$^5$ ............................................... H05B 1/02
[52] U.S. Cl. .................................... 219/497; 219/494; 219/501; 219/508; 307/117
[58] Field of Search ............... 219/494, 493, 497, 499, 219/501, 216, 210, 211, 505, 508, 509, 506; 323/235, 236; 307/252 UA, 252 UB, 310, 117

[56] References Cited

U.S. PATENT DOCUMENTS

| | | | |
|---|---|---|---|
| 3,586,830 | 6/1971 | Leitner et al. | 219/501 |
| 3,878,358 | 4/1975 | Barton et al. | 219/505 |
| 4,113,391 | 9/1978 | Minowa | 219/483 |
| 4,374,321 | 2/1983 | Cunningham, Jr. et al. | 219/497 |
| 4,614,860 | 9/1986 | Kativois | 219/497 |

Primary Examiner—M. H. Paschall
Attorney, Agent, or Firm—Mason, Kolehmainen, Rathburn & Wyss

[57] ABSTRACT

A temperature controller utilizes a square wave signal whose pulse width is incrementally stepped in variable increments by a variable count in a register to determine the temperature being read by a sensor. The square wave signal is integrated to provide an analog signal that is compared to an analog signal provided by the sensor. When the amplitude of the integrated analog signal approaches the amplitude of the signal from the sensor, the count in the register is noted and the temperature is determined from the count by a piecewise linear equation. The temperature thus obtained is compared to a user selected temperature to control the temperature in the sensed area. The controller also includes a monitoring system that monitors the status of switching devices that are controlled by the controller to assure that the status of the switching devices corresponds to the status selected by the controller.

20 Claims, 8 Drawing Sheets

FIG_5

PIECEWISE LINEAR TEMPERATURE CONTROLLER UTILIZING PULSE WIDTH MODULATION

BACKGROUND OF THE INVENTION

1. Field of the Invention

This invention relates generally to temperature controllers and, more particularly, to temperature controllers that monitor and control the temperature of a home appliance such as a baking or broiling oven or the like.

2. Prior Art

Temperature controllers for appliances are well known and use various systems ranging from bimetallic strips to digital control systems that operate on a signal received from a thermal sensor to control temperatures. While such systems do provide a way to control temperature, the mechanical bimetallic strip based systems must be carefully designed to provide the required accuracy and are not readily adjustable if, for example, a temperature offset or other recalibration is desired. The microprocessor based systems provide good accuracy and control flexibility, but require relatively complex hardware or software to compensate for the nonlinearities and manufacturing tolerances of the temperature sensors used in the system. Typically, in such systems the temperature-resistance or temperature-voltage characteristics of a sensor are mapped into a look-up table, or a nonlinear equation defining those characteristics is determined. The system then either utilizes the look-up table to determine a temperature based on the input voltage or solves the nonlinear equation to determine the temperature. However, the provision of sufficient memory to define a look-up table having the required accuracy, or the provision of computing capability to solve a nonlinear equation adds complexity to the system, and also makes providing a temperature offset more difficult.

Microprocessor controlled systems of the type described above generally control the application of energy to a heating device, for example, by controlling a gas valve that controls the application of gas to a burner or by controlling a switching device that applies electrical power to a heating element. In such systems, it is desirable to monitor the status of the energy controlling devices used in the system to assure that energy is applied to the heating device only when called for. This has been done in the past utilizing optical couplers to isolate the electrical switching devices from the sensing circuitry to prevent the high voltages controlled by the switching devices from damaging the sensing circuitry or being a hazard to the user. Unfortunately, such optical isolators add cost to the system.

SUMMARY OF THE INVENTION

Accordingly, it is an object of the present invention to overcome many of the disadvantages of the prior art systems.

It is another object of the present invention to provide a temperature controller that accurately controls the temperature of an appliance without the use of look-up tables or complex equations.

It is another object of the present invention to provide a temperature controller for an appliance that utilizes a variable stepped pulse width modulated analog-to-digital converter to sense temperature.

It is another object of the present invention to utilize a piecewise linear relation using simple linear functions to compute temperature.

It is another object of the present invention to provide a simplified system for monitoring status of switching devices that control the operation of the heating elements that are controlled by the system.

Briefly, in accordance with the present invention there is provided a square wave signal having a pulse width that is stepped in variable increments. The square wave is integrated to provide a stepped amplitude signal that is compared with an analog signal received from a temperature sensor. The pulse width is initially stepped in large increments until the integrated analog voltage exceeds the analog voltage from the sensor at which point the integrated analog voltage is alternately reduced and decreased in ever decreasing increments by appropriately increasing and decreasing the pulse width of the square wave signal until the amplitude of the integrated analog signal approaches the amplitude of the signal from the temperature sensor within a predetermined increment. A count in a register is used to determine the pulse width of the square wave signal that results in the integrated analog signal. The count in the register is monitored, and when the amplitude of the integrated signal is approximately the same as the amplitude of the signal from the sensor, the count is operated upon by a piecewise linear equation that is an approximation of the sensor characteristic to determine temperature. The temperature thus determined is compared with a user selected temperature and a heating element is selectively energized as necessary to maintain the temperature at the temperature selected by the user. Multiple sensors may be monitored by successively comparing the integrated analog signal with the signals from the various sensors and obtaining the count in the register that provides the integrated analog signal that corresponds to each sensor signal.

A temperature offset is readily achieved by adding or subtracting a constant to the Y intercept of the piecewise linear equation. The switching devices used to control the heating elements are monitored by a simplified monitoring scheme that employs a high impedance circuit in place of optical couplers or the like to achieve isolation from the high voltages controlled by the switching devices.

DESCRIPTION OF THE DRAWING

These and other objects and advantages of the present invention will become readily apparent upon consideration of the following detailed description and attached drawing, wherein:

FIGS. 4-6 are logical flow diagrams illustrating the logical operations performed by the controller utilizing the pulse width modulation analog-to-digital conversion.

DETAILED DESCRIPTION

Figure 1:
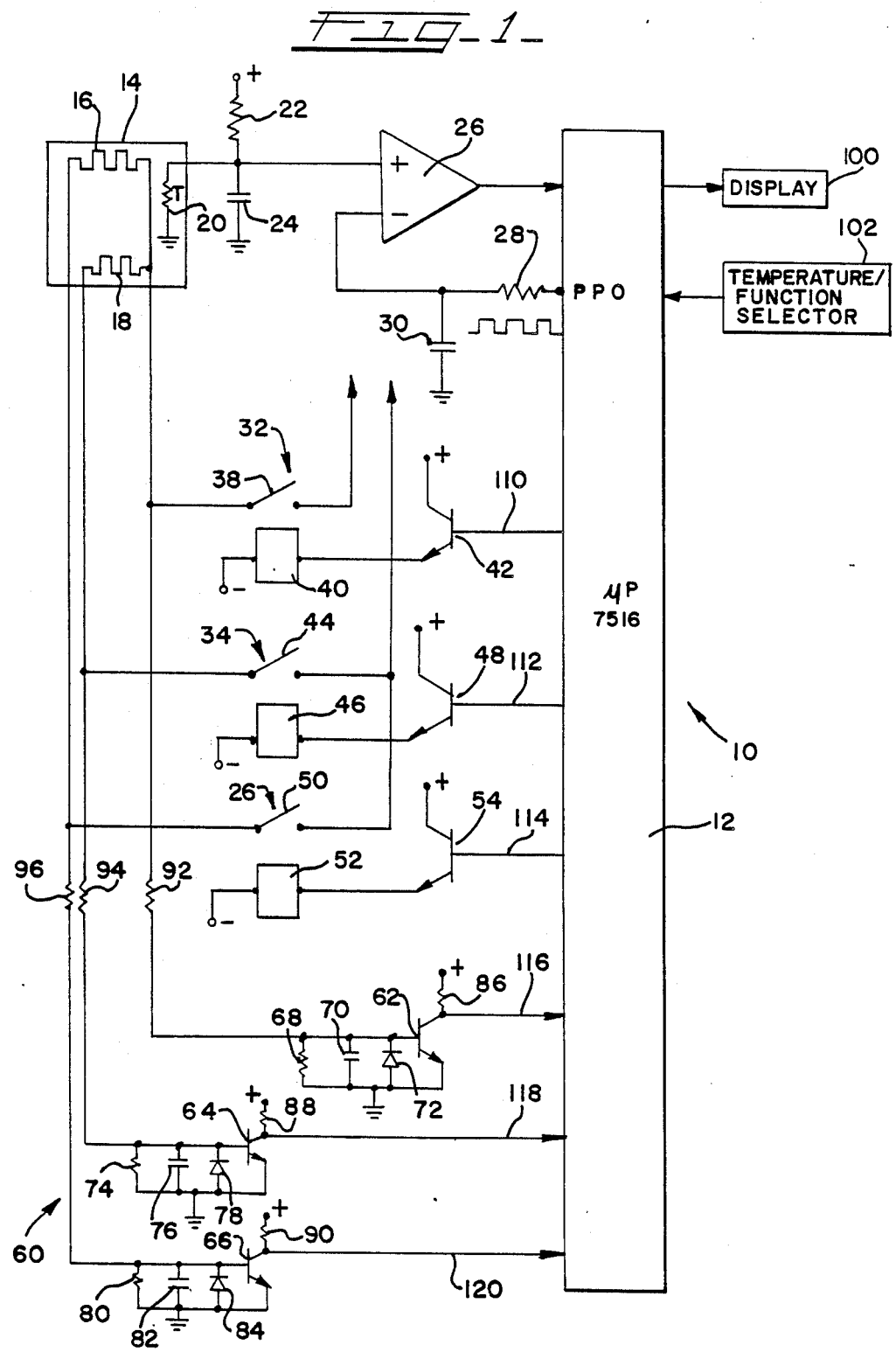
FIG. 1 is a simplified block and schematic diagram of the temperature controller according to the invention.

Referring now to the drawing, with particular attention to FIG. 1, there is shown a microprocessor controlled temperature control system generally designated by the reference numeral 10. The temperature control system 10 utilizes a microprocessor 12 to perform the basic control functions as will be described in subsequent portions of the specification.

In the illustrated embodiment, the microprocessor 12 is a Type 7516 microprocessor that is manufactured by NEC and others. The Type 7516 microprocessor was selected because it has the capability of providing a variable pulse width square wave output signal that is useful for making the temperature measurement, as will be subsequently described; however, a microprocessor without such a feature may also be used and the variable square wave may be provided by other circuitry, such as, for example, an interrupt timer.

The system 10 controls the temperature within an appliance such as an oven 14 which may be an electric or a gas oven or other similar appliance. In the illustrated embodiment, the oven 14 is illustrated as an electric oven having a broiling heating element 16 and a baking heating element 18; but it should be understood that different configurations of elements could be used and that the system is usable for controlling the temperature of appliances that are heated (or cooled) by various methods. The system according to the invention employs a thermistor 20 within the oven 14 that is electrically connected to a resistor 22 and a capacitor 24 and to one input of a comparator 26. The other input of the comparator 26 is connected to an integrating circuit comprising a resistor 28 and a capacitor 30 that integrates a variable pulse width square wave signal to provide an analog signal whose amplitude is compared by the comparator 26 with the amplitude of the signal at the junction of the resistor 22 and thermistor 20. Power is applied to the heating elements 16 and 18 by three relays 32, 34 and 36. The relay 32 has a contact armature 38 that selectively closes a circuit between one line of a power supply and one side of the heating elements 16 and 18. The relay 32 also has a coil 40 that is selectively energized by a transistor 42 under the control of the microprocessor 12 to selectively connect the heating elements 16 and 18 to one side of the power line. The relay 34 has an armature contact 44 that is actuated by a coil 46 and selectively connects the other side of the power line to the other side of the baking element 18. The coil 46 is energized by a transistor 48 under the control of the microprocessor 12. The relay 36 has an armature contact 50 that is controlled by a coil 52 in order to selectively connect the other side of the broiling element to the power line to selectively energize the element 16. The coil 52 is energized by a transistor 54 under the control of the microprocessor 12. While the switching devices that control the operaration of the heating elements 16 and 18 have been illustrated as the relays 32, 34 and 36, it should be understood that other switching devices including semiconductor devices such as thyristors or other electrical switching devices could also be used. Also, it should be understood that the switching devices could be replaced by other control devices such as gas valves that are controlled by the transistors 42, 48 and 54 if the controller were used in a gas oven environment.

In order to monitor the status of the relays 32, 34 and 36, there is provided a monitoring circuit 60 comprising three transistors 62, 64 and 66 that monitor the voltage on the load side of the relays 32, 34 and 36. A rectifier/filter circuit comprising a resistor 68, a capacitor 70 and a diode 72 is used to rectify the signal applied to the base of the transistor 62. Similarly, a rectifier/filter circuit comprising a resistor 74, a capacitor 76 and a diode 78 is provided for the transistor 64, and a similar circuit comprising a resistor 80, a capacitor 82 and a diode 84 is provided for the transistor 62. Resistors 86, 88 and 90 serve as collector load resistors for the transistors 62, 64 and 66, respectively, and resistors 92, 94 and 96 serve to isolate the monitoring circuitry 60 from the high voltages present at the contacts of the relays 32, 34 and 36, respectively. A display 100 is coupled to the microprocessor 12 and serves to display various functions normally displayed by appliances such as time of day, the operational status of the appliance, for example, whether the appliance is on or off or in a baking, broiling or self-cleaning mode of operation. A temperature/function selector 102 is also provided to permit the user to enter operational instructions into the system. For example, the selector 102 may be a keypad that permits the user to select a desired cooking temperature by entering that temperature via the keypad and to select other functions such as baking, broiling or self-cleaning by touching the appropriate keypads. Also, other instructions such as cooking time and cooking start and stop times may also be entered via the selector 102.

As previously discussed, the pulse width of the square wave at the PPO output of the microprocessor is dependent upon a count entered into the PPO register of the microprocessor. The count in the PPO register may vary over a large range depending on the range of pulse widths required, and in the present embodiment, the range of values in the PPO register will vary between 1000 and approximately 9,000. The variable pulse width square wave at the PPO terminal of the microprocessor 12 is a unit directional pulse, and consequently, when integrated by the resistor 28 and capacitor 30 provides a DC voltage whose amplitude is proportional to the pulse width of the square wave. This DC voltage is compared with the DC voltage present at the junction of the resistor 22 and the thermistor 20, and thus, the count in the PPO register corresponding to a particular temperature can be determined.

The resistor 22 and the thermistor 20 form a voltage divider and hence, the voltage at the junction of the resistor 22 and the thermistor 20 is a function of the resistance of the thermistor 20 which is related to the temperature in the oven 14. By comparing the voltage at the junction of the resistor 22 and the thermistor 20 with the integrated square wave at the junction of the resistor 28 and the capacitor 20, for various values of temperature and values of count in the PPO register, a temperature versus PPO register value plot can be made. The plot can be made for a single temperature sensor such as the thermistor 20 and resistor 22 or for additional temperature sensors, such as, for example, meat and candy thermometers. Such additional sensors can then be monitored by successively comparing the integrated square wave signal with the various sensor signals and determining the register count that provides the integrated square wave signal that corresponds to each sensor signal. Temperature can then be determined from the appropriate temperature versus PPO register value plot.

Figure 2:
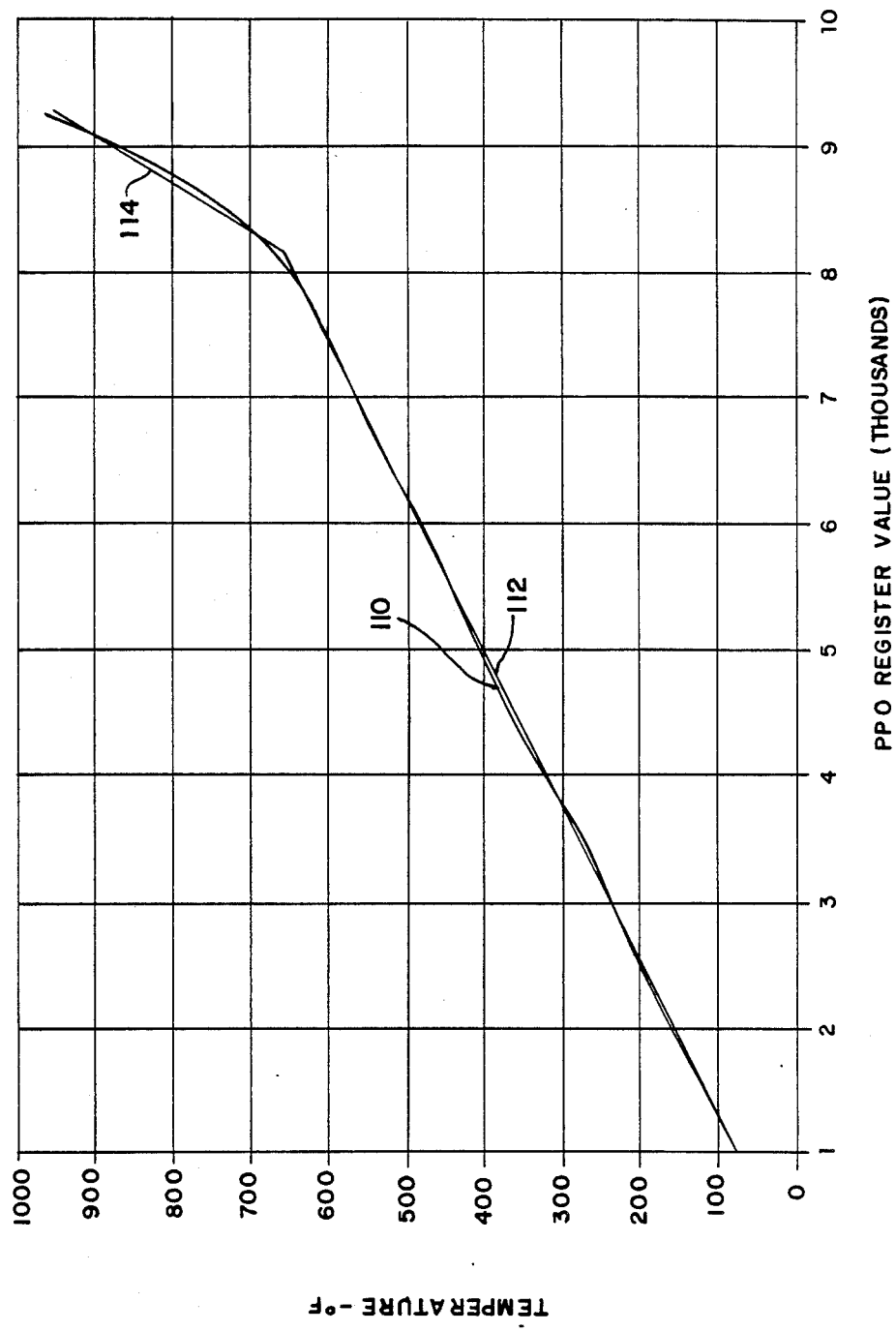
FIG. 2 is a graph illustrating the nonlinear relationships between the register count and temperature and the piecewise linear relationship used to approximate the nonlinear relationship.

A typical plot is illustrated in FIG. 2. The temperature versus PPO register value for various temperatures is illustrated by the curved line 110 in FIG. 2. The shape of the curved line 110 can be approximated in a piecewise linear fashion by two straight lines 112 and 114 whose equations can readily be calculated. The equation for each of the line segments 112 and 114 is equal to $Y=MX+B$ where Y is the Fahrenheit (or other) temperature, X is the PWM register value, M is the slope of the line and B is the Y/X as intercepted. The slope of the line is equal to: $-(Y_{max}-Y_{min})/(X_{max}-X_{min})$, where $X_{max}$, $Y_{max}$ and $X_{min}$, $Y_{min}$ correspond to the end points of the line or to any conveniently spaced coordinates on the line. Thus, the equations for the two lines 112 and 114 can be readily ascertained and the appropriate equation used in the corresponding range of counts of the PPO register. Also, to achieve a temperature offset, the appropriate offset is added to or subtracted from the Y intercept, B, of the equation $Y=MX+B$.

Figure 3:
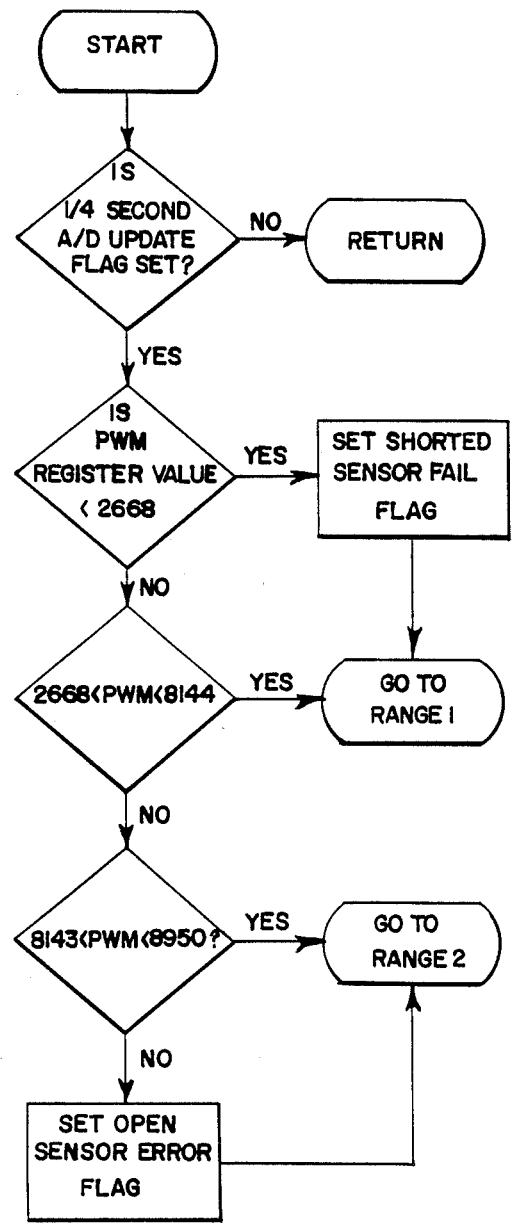
FIGS. 3-4 are logical flow diagrams illustrating the logical operations performed by the controller in converting the register count to temperature utilizing a piecewise linear coversion.
Figure 4:
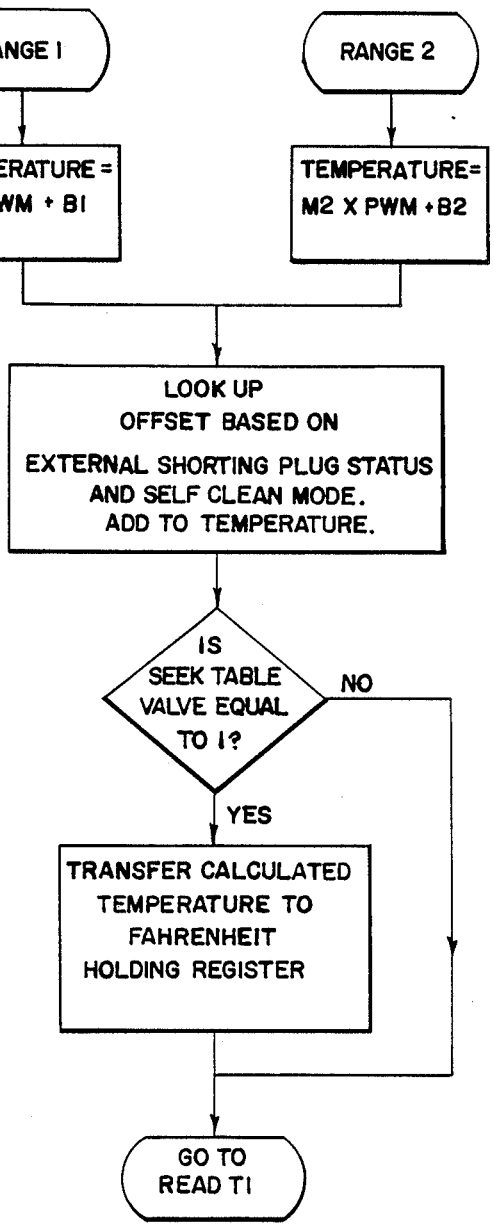

Once the values for the constants of the equation $Y=MX+B$ have been determined for the two segments 112 and 114, it is necessary to determine which set of constants is applicable. The determination of the appropriate set of constants is made by the software in the system as illustrated by the flow charts of FIG. 3 in conjunction with the flow chart illustrated in FIG. 4. The determination is made periodically four times per second; thus, after the start of the program, a one-fourth second update flag is set. If the flag is not set the system waits until it has been set. Once the flag has been set, a determination is made as to whether the value of the count in the PWM register is less than 2668. If it is less than this value, this is indicative that the sensor 20 is shorted and a shorted sensor flag is set. If the count in the PWM register is not less than 2668, a determination is made as to whether it is between 2668 and 8144. If it is within the aforesaid range, that indicates that the count is within the piecewise range spanned by the line segment 112 (FIG. 2) and the constants designed as Range 1 and corresponding to the constants for the line 112 are utilized. If the count is not within the 2668 to 8144 range, a determination is made as to whether the count is between 8143 and 8950. If not, this is indicative that the sensor 20 is open and an open sensor error flag is set. If the count is within the above range, then the set of constants for the line segment 114, as defined by Range 2, are utilized in making the temperature determination.

Figure 5:
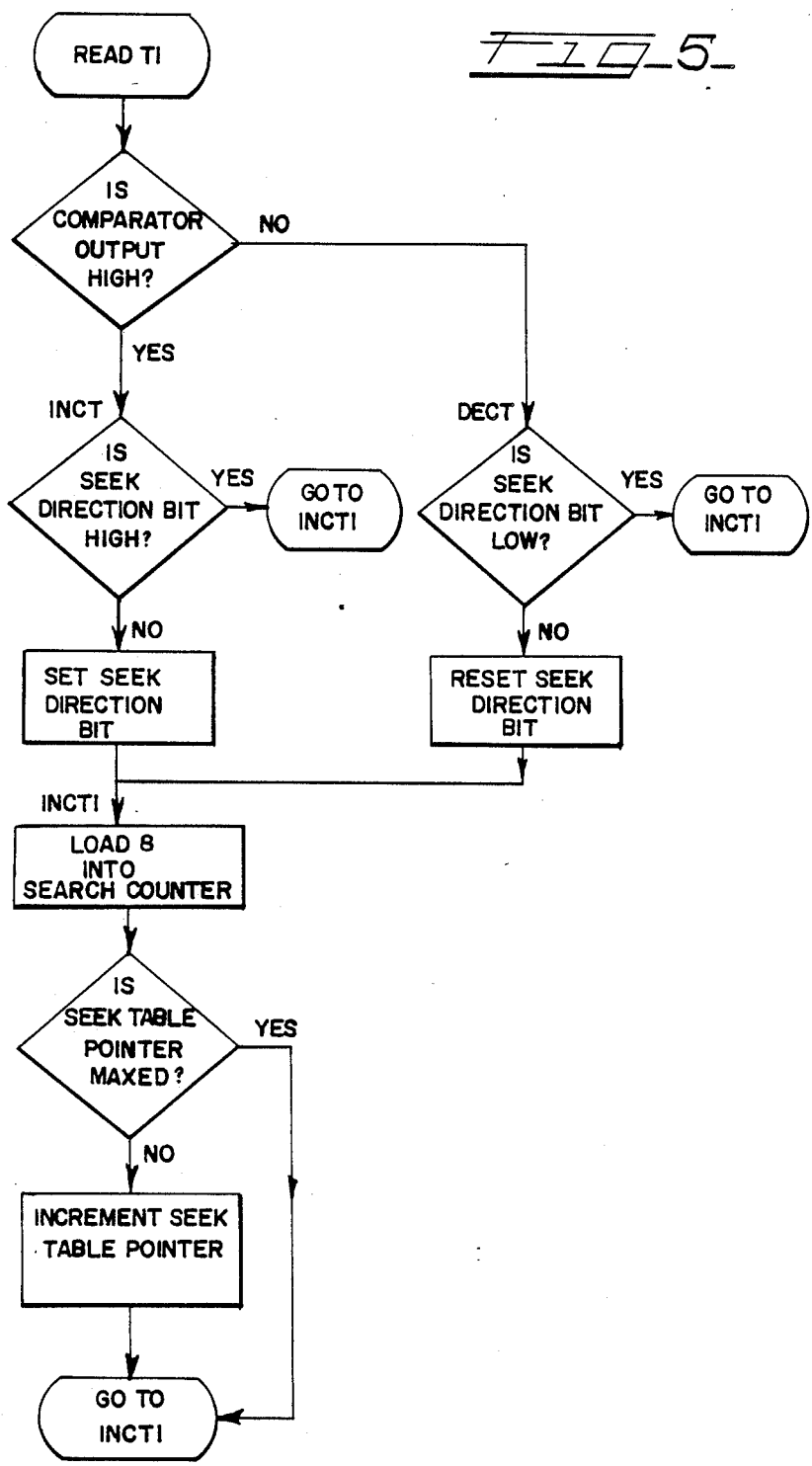
Figure 6:
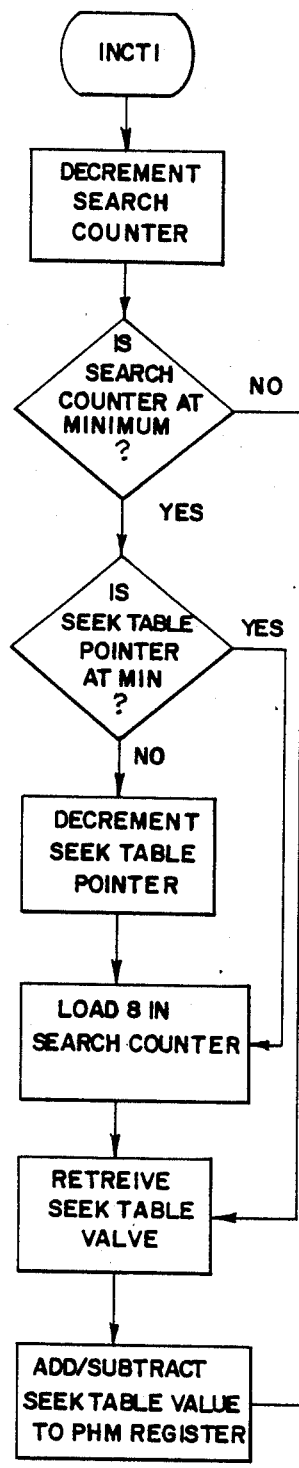

Depending on whether Range 1 or Range 2 was selected by the algorithm, different constants are used to determine temperature. For example, for Range 1, the temperature is equal to $M1 \times PWM + B1$ where PWM is the count in the PPO register and M1 and B1 are the slope and Y-axis intercept of the line segment 112. Similarly, for higher values of count in the PWM register, the temperatures determined by the equation $M2 \times PWM + B2$, wherein M2 and B2 are the slope and Y-axis intercept of the line segment 114. The temperature thus calculated is the temperature that corresponds to the count PWM present in the PPO register, and any offset that is desired is added to the temperature based on the desired offset and whether the oven is in a self-cleaning mode. After the addition of the offset, the offset temperature corresponding to the count PWM in the PPO register is determined. However, this temperature must be related to the temperature being read by the sensor 20. If the temperature determined from the PWM register is substantially equal to the temperature being read by the sensor 20 within a predetermined increment (which in the present embodiment corresponds to a value of 1 in the Seek Table, as is discussed in conjunction with FIG. 6), then the temperature determined from the PWM register is considered to be equal to the sensed temperature and is transferred to a Fahrenheit holding register. If not, the temperature is again read by a READ T1 algorithm as illustrated in FIGS. 5 and 6.

In order to determine whether the count in the PPO register corresponds to the sensed temperature, the count is incremented to provide a square wave whose pulse width is periodically stepped in variable size increments to provide a stepped analog signal at the output of the integrator that is compared with the signal from the temperature sensor 20. This is accomplished by a seek routine that first selects a value for the PWM count that corresponds to a temperature of 75° F. (nominally room temperature), and compares the integrated analog voltage with the voltage from the sensor. If the integrated voltage is low, the pulse width of the square wave is increased by a predetermined amount and the comparison is again made. If the integrated voltage is still low, the pulse width is again increased by the same amount and the comparison again made. The process is repeated until the integrated voltage exceeds the voltage from the sensor. At this point, the pulse width is decreased by an amount equal to one-half the increment by which the PWM count in the PWM counter was last increased and the comparison is again made. If the incremented voltage is still above the voltage from the sensor, the count PWM is again decremented by the same amount until the integrated voltage drops below the voltage from the sensor. When this occurs, the count PWM is again increased by an amount equal to one-half of the previous decrement and the process is repeated so that the integrated voltage fluctuates about the voltage from the temperature sensor in ever decreasing increments until the integrated voltage approaches the sensed voltage by a predetermined increment.

In the illustrated embodiment, the seek algorithm utilizes the following values for incrementing the PWM count, as illustrated in the PWM Seek Table below:

| PWM SEEK TABLE |
| --- |
| 256 |
| 128 |
| 64 |
| 32 |
| 16 |
| 8 |
| 4 |
| 2 |
| 1 |

The system first loads a count into the PWM counter that corresponds to a temperature of 75° Fahrenheit, as determined by the appropriate line segment equation. A pointer is positioned at the largest increment, 256 counts, of the PWM Seek Table. The output of the comparator 26 is checked, and if the value of the integrated square wave voltage is low, as indicated by a low output of the comparator 26, an increment of 256 counts is added to the PWM register count. The output of the comparator 26 is checked again, and if the output of the comparator 26 has not gone high, a count of 256 is again added until the output of the comparator changes state and goes low. When the comparator changes state, a count of 128 is subtracted from the PWM count and the monitoring of the output of the comparator is continued, and each time the comparator changes state, the increment added to or subtracted from the PWM count moves down one line on the PWM Seek Table. The process continues with the integrated voltage fluctuating about the sensor voltage in ever decreasing increments until the increment as determined by the PWM Seek Table is reduced to one. At this point, it is determined that the integrated square wave voltage is sufficiently close to the voltage from the sensor, and the current PWM count is a true representation of temperature being sensed by the sensor.

Referring back to FIG. 4, if the Seek Table value is equal to one, the corresponding calculated temperature is transferred to a Fahrenheit holding register. If not, the calculated temperature is not stored. In either event, the routine then transfers to the READ T1 subroutine that increments or decrements the pulse width until the temperature is determined as illustrated in FIGS. 5 and 6. In the READ T1 subroutine, the output of the comparator 26 is monitored after each comparison to determine whether the comparator has changed state. A change of state is indicated by the output of the comparator being high together with the occurrence of a high seek direction bit (positive incrementation) or the output of the comparator not being high together with a low seek direction bit (decrementation of the counter). The system illustrated in FIGS. 5 and 6 utilizes a search counter to count the number of comparisons that are made between occurrences of changes of state of the comparator 26. The system counts the number of comparisons that are made without the occurrence of a change of state. If more than eight comparisons are made without the occurrence of a change of state, the Seek Table pointer is incremented by one line to increase the amount that the integrated voltage is stepped. This is accomplished by loading an 8 into the search counter and decrementing it each time a comparison without a change of state occurs, and increasing the size of the stepped increment when the search register count reaches zero.

The relays 32, 34 and 36 are controlled by the transistors 42, 48 and 54 under the control of the microprocessor 12 that selectively generates a high level or low level signal on each of three lines 110, 112 and 114 that are connected to the base electrodes of the transistors 42, 48 and 54, respectively. If the state of the signal on any one of the lines 110, 112 and 114 is low, the corresponding relay 32, 34 or 36 is not energized. Similarly, if the signal on any of the lines 110, 112 or 114 is high, then the corresponding one of the relays 32, 34 and 36 is energized.

As previously stated, the status of the contacts of the relays is monitored by a monitoring circuit 60 that is coupled to the output contacts of the three relays to determine whether the relay contacts are open or closed. Because the contacts of the three relays switch high voltage, high power circuits, isolation must be provided between the relay contacts and the monitoring circuit 60 to avoid damage to the monitoring circuit 60 and possibility of electric shock to the user. This is accomplished by the three isolation resistors 92, 94 and 96 which each have a resistance of on the order of 4 megohms The resistors 92, 94 and 96 cooperate with resistors 68, 74 and 80, respectively, to form a voltage divider to reduce the voltages applied to the bases of the transistors 62, 64 and 66 to a low level. In the present embodiment, the resistance of each of the resistors 68, 74 and 80 is on the order of 100 kilohms so that the voltage present at the contact of the relays is divided by a factor of approximately 40 before being applied to the monitoring circuit 60. A high value for the resistance of the resistors 92, 94 and 96 was chosen so that the maximum current that could flow from the relay contacts to the monitoring circuit 60 would be limited to a safe value. Also, although the resistors 92, 94 and 96 are illustrated as single resistors in FIG. 1, two or more resistors connected in series could be used in place of a single resistor. For example, two 2-megohm resistors connected in series could be used in place of a 4-megohm resistor. Such an arrangement would have the advantage that if one of the resistors should short out, the other one of the resistors would still limit the maximum current that could be applied to the monitor 60 to a safe value.

The voltage applied to the bases of the three transistors 62, 64 and 66 are rectified by the diodes 72, 78 and 84 and filtered by the capacitors 70, 76 and 82 to provide a DC voltage at the bases of the respective transistors 62, 64 and 66 when an AC voltage is present at the monitored contacts of the relays 32, 34 and 36. When such a voltage is present, the appropriate transistors 62, 64 and 66 will conduct and cause the output at its collector to go low. The outputs of the transistors 62, 64 and 66 are applied to the microprocessor 12 via lines 116, 118 and 120. Thus, because of the phase inverting action of the transistors 62, 64 and 66, a low signal on any one of the lines 116, 118 and 120 will indicate that there is voltage present on the contact being monitored. Thus, if a control signal present on any one of the lines 110, 112 and 114 is high, the monitor signal on the corresponding one of the lines 116, 118 and 120 must be low and vice versa. Otherwise, a flag indicating a fault is set.

In the illustrated embodiment, the signal on the line 110 controls the application of power to the ends of the broiling element 16 and the baking element 18 that are connected in common. The signal on the line 112 controls the application of power to the other end of the baking element 18 and the signal on the line 114 controls the application of power to the other end of the broiling element 16.

There are four possible combinations of control signals that can be applied to the lines 114, 112 and 110 by the microprocessor 12. These correspond to both elements being off, only the bake element 18 being on, only the broil element 16 being on, and both elements being on. With all elements being off, all three signals on the lines 114, 112 and 110 will be low or zero providing a status reading of 000 when reading the status of the signals on the lines 114, 112 and 110, respectively. If there is no fault in the system, because of the phase inversion of the transistors 62, 64 and 66, the monitored signals on the lines 116, 118 and 120 should be 111 (7). Any other reading on the lines 116, 118 and 120 when the status of the lines 110, 112 and 114 is 000 would be indicative of a fault.

If only the bake element were energized, a high would be present on the lines 110 and 112 resulting in a status of 011 (3) on the lines 110, 112 and 14. This would correspond to a monitored signal on the lines 120, 118 and 116 of 100. If only the broil element were selected for energization, the status of the signals on the lines 114, 112 and 110 would be 101 (5) and the corresponding status on the lines 120, 118 and 116 would be 010 (2). If both the baking and broiling elements 18 and 16 were selected, the status on the lines 114, 112 and 110 would be 111 (7), which would correspond to a status of 000 on the lines 120, 118 and 116.

Figure 7:
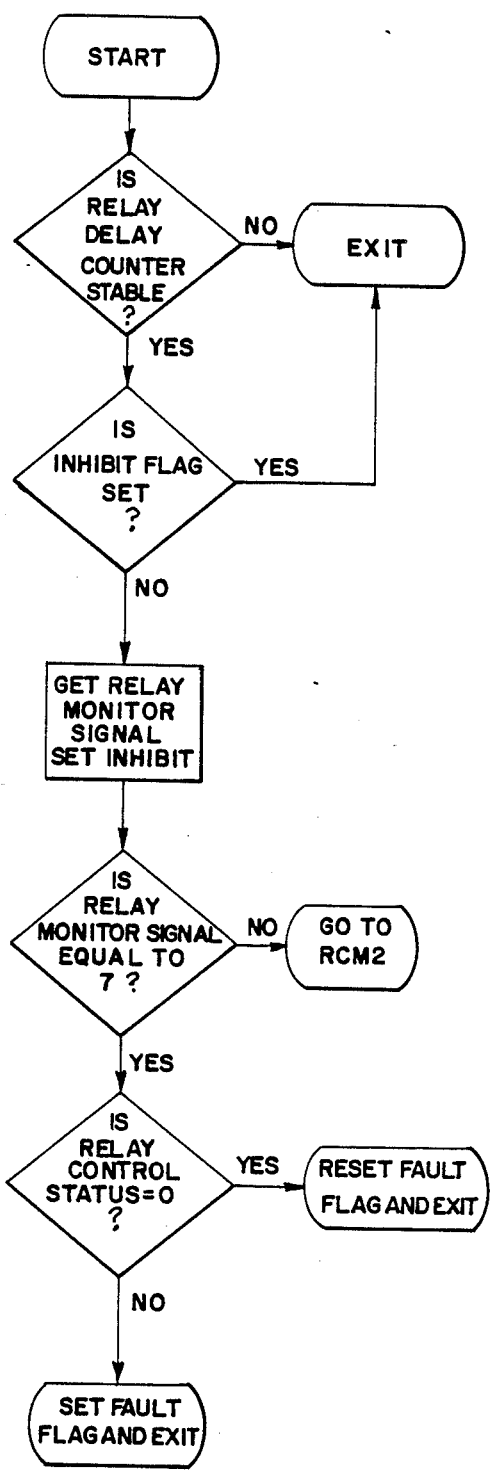
FIGS. 7-9 are logical flow diagrams illustrating the logical operations performed by the heating element status monitoring circuitry.
Figure 8:
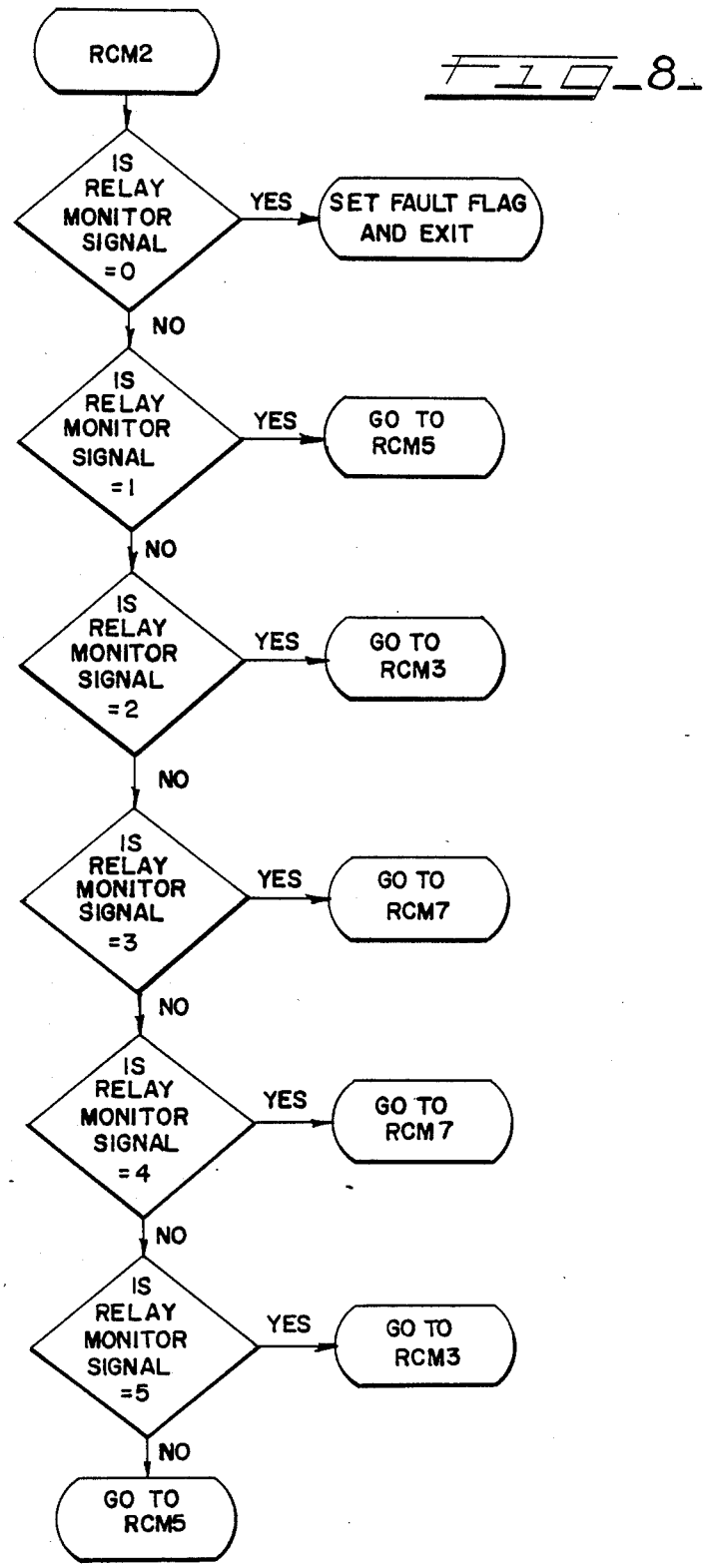
Figure 9:
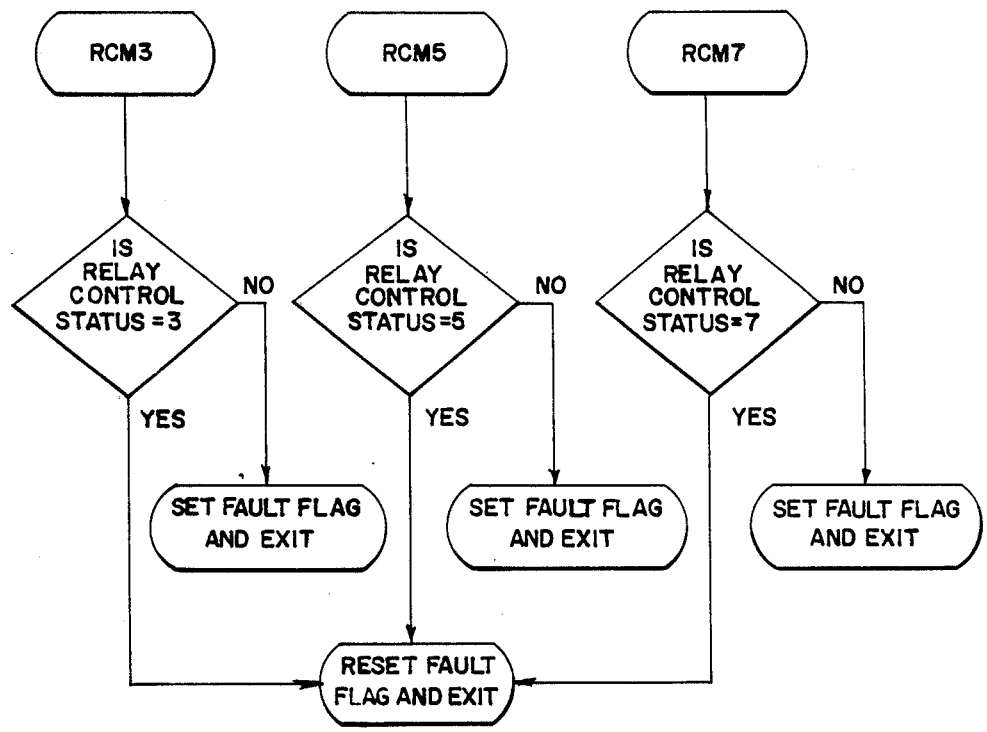

The monitoring of the status of the relays is illustrated in the flow charts shown in FIGS. 7-9. In the illustrated system, the relays are timed to turn on in sequence, with the turn on sequence being relay 32, relay 34 and relay 36. The turn off sequence is relay 36, relay 34 and relay 32. A 250 millisecond delay is provided between the turn on of individual relays to increase relay life. The delay is provided by a relay delay counter (FIG. 7). In the monitoring sequence, a determination is made as to whether the relay delay counter is stable and no reading is made until it becomes stable at the end of the 250 millisecond delay time. If it is stable, a determination is made as to whether the inhibit flag has been set. The inhibit flag prevents the status of the relays from being monitored until the AC waveform of the signal being switched by the relays is at its peak. Thus, the inhibit flag is reset by the peak of the AC waveform to permit the reading to be taken. Once the inhibit flag has been reset, the relay monitor signal on the lines 120, 118 and 116 is obtained and a determination is made as to whether its value is equal to 7 (111). A determination is made as to whether the relay control signal on the lines 114, 112 and 110 is equal to 000 and, if so, this is a proper condition and any fault flag is reset and the routine is exited. If the relay control status is not zero, a fault flag is set. If the value of the relay monitor signal on the lines 120, 118 and 116 were not equal to 7, then the value would be determined by the subroutine RCM2 (FIG. 8). The subroutine RCM2 of the relay contact monitor routine steps through all possible values of the status of the signals on the lines 120, 118 and 116. Based on the monitored value, a determination is made as to whether the monitored value corresponds to the appropriate one of the three possible values of the relay control signal on the lines 114, 112 and 110 (3=bake, 5=broil, 7=clean). This is accomplished by the algorithm illustrated in FIG. 8 wherein the relay monitor signal is monitored to determine whether it has any of its possible values including the values that correspond to one of the four possible states of the control signal or represent a fault condition. Thus, the status of the relay monitor signal is monitored, and depending on its value, a determination is made as to whether the monitored signal corresponds to one of the three control signals calling for bake, broil or clean. The latter function is controlled by the flow chart illustrated in FIG. 9.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent is:

1. A controller for controlling the temperature of a temperature controlled area of an appliance, comprising:
    a temperature sensor disposed within said temperature controlled area, said sensor being operative to provide a signal that is related to the temperature of the temperature controlled area according to a non-linear relationship;
    means including a variable pulse width signal generator and an integrator for generating a reference signal whose amplitude is determined by the width of the pulses generated by said variable pulse width signal generator;
    means for applying a variable magnitude count signal to said variable pulse width signal generator for altering the width of the pulses generated by said generator in accordance with the magnitude of the count signal;
    means for comparing the signal from said sensor with said reference signal as the variable magnitude count signal is varied and determining the magnitude of the variable magnitude count signal when the reference signal is substantially equal to the signal from the temperature sensor; and
    means responsive to the comparing means for calculating the temperature in the controlled area from the magnitude of the variable magnitude count signal present when the sensor and reference signals are substantially equal utilizing a piecewise linear equation.

2. A controller as recited in claim 1 wherein said pulse width altering means includes means for altering the width of the pulses in variable increments.

3. A controller as recited in claim 2 wherein said pulse width altering means includes means for initially altering the width of the pulses in first predetermined increments and means responsive to said comparing means reducing the magnitude of the increments as the magnitude of the reference signal approaches the magnitude of the signal from the temperature sensor.

4. A controller as recited in claim 3 wherein said increment reducing means includes means responsive to the relative magnitudes of the reference signal and the signal from said temperature sensor for increasing the width of said pulses by said predetermined increment as long as the magnitude of the reference signal is less than the magnitude of the signal from the temperature signal, said increment reducing means being operative to reduce the width of said pulses by a reduced increment when the magnitude of the reference signal exceeds the magnitude of the signal from the temperature sensor.

5. A controller as recited in claim 4 wherein said increment reducing means includes means for alternately increasing and reducing the pulse width of said pulses in ever decreasing increments each time the relative magnitude of the reference signal and the signal from the temperature sensor changes.

6. A controller as recited in claim 5 further including means for counting the number of times the magnitude of the increments has been reduced and for determining the magnitude of the variable count signal after the magnitude of the increments has been reduced a predetermined number of times.

7. A controller as recited in claim 6 wherein said increment is reduced by a factor of one-half each time the relative magnitude of the reference signal and the signal from the temperature sensor changes.

8. A controller as recited in claim 7 wherein said predetermined number of times is eight.

9. An electronic control circuit comprising:
    means for providing a sensed signal having a variable characteristic responsive to a sensed value;

means for generating a reference signal, said reference signal having a predetermined pulse width;

means coupled to said sensed signal providing means and said reference signal generating means for comparing said reference signal and said sensed signal to provide a comparator signal indicating which of the compared signals is greater; and said reference signal generating means including means responsive to said comparing means for generating another reference signal in response to a change in the comparator signal, each said other successively generated reference signal being alternately greater and less than said sensed signal in successively decreasing discrete pulse width steps around said sensed signal to identify a a reference signal pulse width corresponding to said sensed signal.

10. An electronic control circuit as recited in claim 9 further comprising means interposed between said reference signal generating means and said comparing means for converting said reference signal to an analog reference signal.

11. An electronic control circuit as recited in claim 9 wherein said sensed signal providing means comprises a voltage divider pair of series connected resistors, with one resistor having a resistance value proportional to ambient temperature.

12. A temperature controller, comprising:

means for sensing temperature and providing a signal representative of the sensed temperature;

means for providing a reference signal, said reference signal providing means including a variable pulse width signal generator and means coupled to said variable pulse width signal generator for receiving the pulses generated by the variable pulse width signal generator and generating said reference signal in response thereto, wherein said reference signal has a magnitude that is proportional to the width of the pulses generated by said variable pulse width signal generator;

means coupled to said temperature sensing means and said reference signal providing means for comparing said temperature signal and said reference signal and providing a comparison signal in response to said comparison, said comparison signal having first and second states, one of said states indicating that the temperature signal is larger than the reference signal and the other state indicating that the reference signal is larger than the temperature signal; and means coupled to said reference signal providing means for altering the width of the pulses generated by the variable pulse width signal generator in variable increments to thereby alter the magnitude of the reference signal in variable size increments, said width altering means being responsive to said comparing means for incrementing the magnitude of the reference signal in predetermined increments in a first direction when said comparison signal is in its first state and for incrementing the reference signal in reduced increments in the opposite direction when the comparison signal changes state.

13. A temperature controller as recited in claim 12 wherein said reference signal generator includes a count signal generator that generates a count that is proportional to the magnitude of the reference signal.

14. A temperature controller as recited in claim 13 further including means for counting the number of times the comparison signal changes state and determining the value of the count signal present after the comparison signal has changed state a predetermined number of times.

15. A temperature controller as recited in claim 14 further including means responsive to the value of the count signal determined by the count signal value determining means for calculating the temperature sensed by the temperature sensing means utilizing the value of the count signal in a precise linear equation.

16. A temperature controlled appliance having a plurality of temperature altering devices and means for monitoring the status of said temperature altering devices, said monitoring means comprising:

means for selectively energizing predetermined ones of said temperature altering devices, said energizing means having an input terminal adapted to be connected to a source of electrical energy and output terminals coupled to said temperature altering devices;

means coupled to said energizing means for selecting the ones of said temperature altering means that are energized by said energizing means; and means coupled to said selecting means and to said energizing means for monitoring the energization of said temperature altering devices to determine whether the selected ones and only the selected ones of the temperature altering devices are energized, said monitoring means including a high impedance conductive device coupled to each of the output terminals of said energizing means for applying a signal representative of the status of the temperature altering devices to said monitoring means.

17. A temperature controlled appliance as recited in claim 16 wherein said high impedance device includes a high resistance device coupled to each of said output terminals.

18. A temperature controlled device as recited in claim 17 wherein each of said high resistance devices has a resistance on the order of 4 megohms.

19. A temperature controlled device as recited in claim 18 wherein each of said high resistance devices comprises a plurality of individual resistors connected in series.

20. A temperature controlled device as recited in claim 16 wherein each of said temperature altering devices includes a heating device.

* * * * *